US012584574B2

(12) United States Patent
Doble et al.

(10) Patent No.: US 12,584,574 B2
(45) Date of Patent: Mar. 24, 2026

(54) COOLANT QUICK CONNECTOR WITH GRAPHENE, INTEGRATED LATCH AND INTEGRATED O-RING RETAINER

(71) Applicant: Martinrea International US Inc., Auburn Hills, MI (US)

(72) Inventors: Cory Doble, Ortonville, MI (US); Murali Chandrasekhar, Rochester Hills, MI (US); Sorin Stancu, Dearborn, MI (US); Ryan Majewski, Grand Blanc, MI (US); Cristian Liliac, Troy, MI (US)

(73) Assignee: Martinrea International US Inc., Auburn Hills, MI (US)

( * ) Notice: Subject to any disclaimer, the term of this patent is extended or adjusted under 35 U.S.C. 154(b) by 28 days.

(21) Appl. No.: 18/423,927

(22) Filed: Jan. 26, 2024

(65) Prior Publication Data

US 2024/0263727 A1 Aug. 8, 2024

Related U.S. Application Data

(60) Provisional application No. 63/442,853, filed on Feb. 2, 2023.

(51) Int. Cl.
| | |
|---|---|
| *F16L 37/127* | (2006.01) |
| *F16L 37/098* | (2006.01) |
| *F16L 37/133* | (2006.01) |

(52) U.S. Cl.
CPC ........... *F16L 37/127* (2013.01); *F16L 37/098* (2013.01); *F16L 37/133* (2013.01)

(58) Field of Classification Search
CPC ... F16L 37/0847; F16L 37/096; F16L 37/098; F16L 37/127; F16L 37/1205; F16L 37/133
See application file for complete search history.

(56) References Cited

U.S. PATENT DOCUMENTS

| | | | |
|---|---|---|---|
| 5,078,429 A * | 1/1992 | Braut | F16L 37/098 |
| 7,344,166 B2 | 3/2008 | Ketcham et al. | |

(Continued)

FOREIGN PATENT DOCUMENTS

| | | |
|---|---|---|
| DE | 20221418 U1 | 10/2005 |
| EP | 0753323 B1 | 3/2003 |

(Continued)

OTHER PUBLICATIONS

International Search Report and Written Opinion for Appl. No. PCT/US2024/013305 mailed May 10, 2024, 15 pages.

*Primary Examiner* — Zachary T Dragicevich
(74) *Attorney, Agent, or Firm* — Dinsmore & Shohl LLP

(57) ABSTRACT

A fluid quick connector incorporating graphene or graphene derivatives into engaging male and female end forms that reduces oxygen and water permeation through the coolant quick connector and includes an integrated latch that eliminates the need for a separate latch component. An integrated retainer is located within the mating interior interface of the female end form and opposing exterior interface of the male end form and, in combination with an EPDM O-ring component, provide for a fluid sealing connection between the end forms which reduces permeation of oxygen and water through the body as well as reducing coolant volume loss so as to maintain an ideal (typically 50/50) water to glycol ratio.

14 Claims, 9 Drawing Sheets

(56)                    References Cited

U.S. PATENT DOCUMENTS

| | | | |
|---|---|---|---|
| 9,890,887 B2 | 2/2018 | Barthel et al. | |
| 10,047,890 B2 | 8/2018 | Li | |
| 2004/0150223 A1* | 8/2004 | Campau | F16L 37/127 |
| 2016/0305590 A1 | 10/2016 | Li | |
| 2021/0010625 A1* | 1/2021 | Ully | F16L 37/096 |
| 2022/0243849 A1 | 8/2022 | Tembad et al. | |
| 2024/0049659 A1* | 2/2024 | Lutzky | F16L 37/133 |

FOREIGN PATENT DOCUMENTS

| | | | |
|---|---|---|---|
| EP | 1154190 B1 | 10/2005 |
| FR | 3120674 A1 | 3/2021 |
| WO | 98/00663 A1 | 1/1998 |

* cited by examiner

COOLANT QUICK CONNECTOR WITH GRAPHENE, INTEGRATED LATCH AND INTEGRATED O-RING RETAINER

CROSS REFERENCE TO RELATED APPLICATIONS

The present application claims the priority of U.S. Ser. No. 63/442,853 filed Feb. 2, 2023.

FIELD OF THE INVENTION

The present invention relates generally to quick connector assemblies. More specifically, the present invention teaches a fluid quick connector incorporating graphene or graphene derivatives for reducing oxygen and water permeation through the coolant quick connector and also includes an integrated latch that eliminates the need for a separate latch component.

BACKGROUND OF THE INVENTION

Traditional coolant quick connectors are known which use a stainless-steel latch to secure the halves of a quick connector system together. The quick connector system typically includes each of a male end form and a mating female quick connector end form. The female quick connector internal design is such that the male end form fits or seats into it, creating a strong leak tight connection. A stainless-steel latch typically forms part of the female portion of the quick connector system, which is used keep the two halves of the quick connector system together while maintaining compression on the seal resulting in a leak-tight joint.

In addition, coolant quick connector bodies are typically made from a polyamide (PA 66)+glass fiber reinforcement. This material selection has met the needs for the coolant system up to now.

With the rapid introduction of electric vehicles into the marketplace, the need for a robust cooling system is more prevalent. One of the challenges with the current material selection for cooling systems is that oxygen and water molecules permeate through the plastic materials. Over time this can result in a volume reduction of liquid in the coolant system and a reduction in a desired 50/50 water to glycol ratio in the liquid coolant, resulting in less-than-optimal cooling performance of the battery system.

SUMMARY OF THE INVENTION

The present invention teaches a fluid quick connector incorporating an integrated latch into the engaging male and female end forms and which includes graphene or graphene derivatives for reducing oxygen and water permeation through the coolant quick connector. This arrangement reduces the coolant volume loss and maintains the ideal 50/50 water to glycol ratio. Additionally, the integrated latch eliminates the need for a separate latch component.

The quick connector includes each of the male and female end forms being connected together via a latch integrated into the female end form, and which eliminates the need for a separate stainless-steel latch component.

A retainer is located within the mating interior interface of the female end form and opposing exterior interface of the male end form and, in combination with an EPDM (ethylene propylene diene terpolymer) O-ring component, provide for a fluid sealing connection between the end forms which reduces permeation of oxygen and water through the body as well as reducing coolant volume loss so as to maintain an ideal (typically 50/50) water to glycol ratio. As is known, EPDM is an extremely durable synthetic material having wide applications.

The retainer can optionally be provided as a separate component however, and in a preferred embodiment, it is integrated into the female end form as one piece in order to eliminate the need for a separate O-ring retainer.

A corresponding method is disclosed for constructing and assembling a fluid quick connect assembly and includes the steps of forming each of a male end form and a female end form from a plasticized material (PA66 or polypropylene) incorporating a graphene or graphene derivative material, and integrally forming at least one latch with the female end form. Additional steps include folding the latches to a closed position prior to assembly, upon which the male end form is aligned with an open end of the female end form and is relatively inserted toward an interior of the female end form in an axial direction. Other steps include forming an angled exterior ramp upon the male end form for co-acting against and outwardly deflecting the female end form, along with the latches, the latches subsequently seating between exterior annular ledges formed in the male end form in order to establish a fluid-tight connection.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached illustrations, the present invention discloses a fluid quick connector incorporating graphene or graphene derivatives into the engaging male and female end forms and which includes an integrated latch for reducing oxygen and water permeation through the coolant quick connector as well as eliminating the need for a separate latch component.

Figure 1:
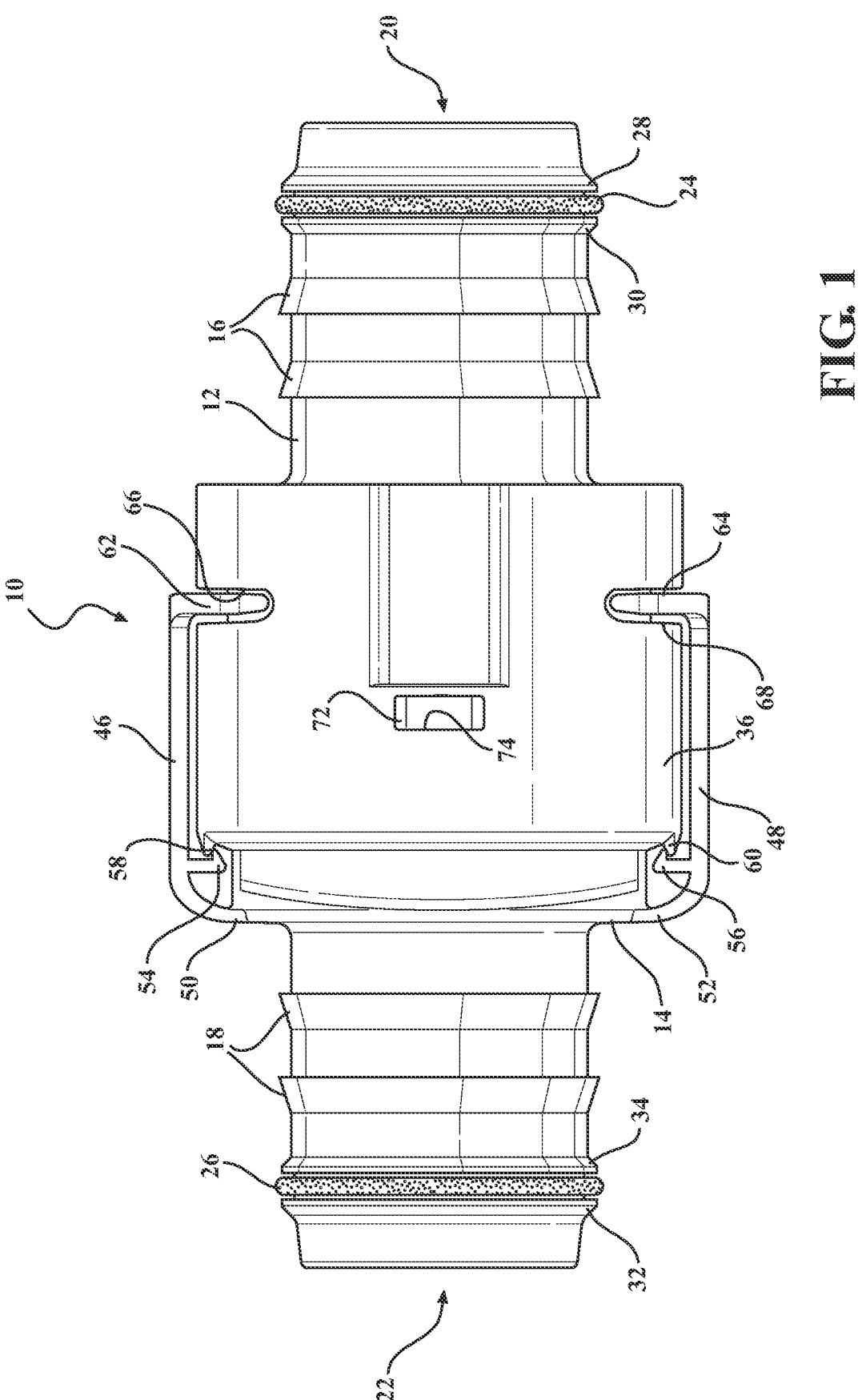
FIG. 1 depicts a plan view illustration of a fluid quick connector assembly according to a non-limiting embodiment of the present invention and depicting male and female interconnecting end forms in a fully seated and latched position.

Referencing initially FIG. 1, depicted is a plan view illustration of a fluid quick connector assembly, see generally at 10, according to a non-limiting embodiment of the present invention and depicting male 12 and female 14 interconnecting end forms in a fully seated and latched position. With further reference to the succeeding views, including the lengthwise cutaway depictions of FIGS. 3-4, each of the male end form 12 and interfacing female end form 14 are constructed of a suitable plastic material not limited to a polyamide (e.g. a PA66 with glass fiber reinforcement) or a polypropylene, each further including a graphene or graphene derivative material for reducing permeation of oxygen and water through the bodies, such as when employed in an EV battery coolant application, and in order to maintain an ideal 50/50 water to glycol ratio for the coolant.

Alternative to PA66, other materials suitable plasticized materials could potentially include polypropylene (PP), which is a thermoplastic polymer that is used in a variety of applications such as packaging, textiles, and automotive parts and is known for its durability, resistance to chemicals, and ability to withstand high temperatures.

Both the male end form 12 and female end form 14 each further include a tubular body shape having a plurality of axially spaced annular and exterior located/reverse angled gripping projections (see at 16 for male end form 12 and further at 18 for female end form 14) for receiving separate fluid lines (not shown) which are dimensioned to be resistively engaged over the open ends, at 20 and 22 respectively, of the male and female end forms 12/14. Each of the male 12 and female end forms 14 further include a gasket ring or seal (see at 24 and 26) which can be constructed without limitation from an EPDM material incorporating a graphene or graphene derivative material.

Other possible materials for producing the gasket ring or seal include, without limitation, other types of fluoropolymers and thermoplastics (not limited to a thermoplastic vulcanizate) which can also include the addition of graphene and graphene derivatives. As further shown, the exterior annular profile of each of the male 12 and female 14 end forms further include pairs of circumferential extending and opposing shoulders (see at 28/30 for male end form 12 and at 32/34 for female end form 14) for capturing and retaining in position the EPDM gasket seals 24/26 during installation of the adjoining sections of tubing (not shown).

Figure 3:
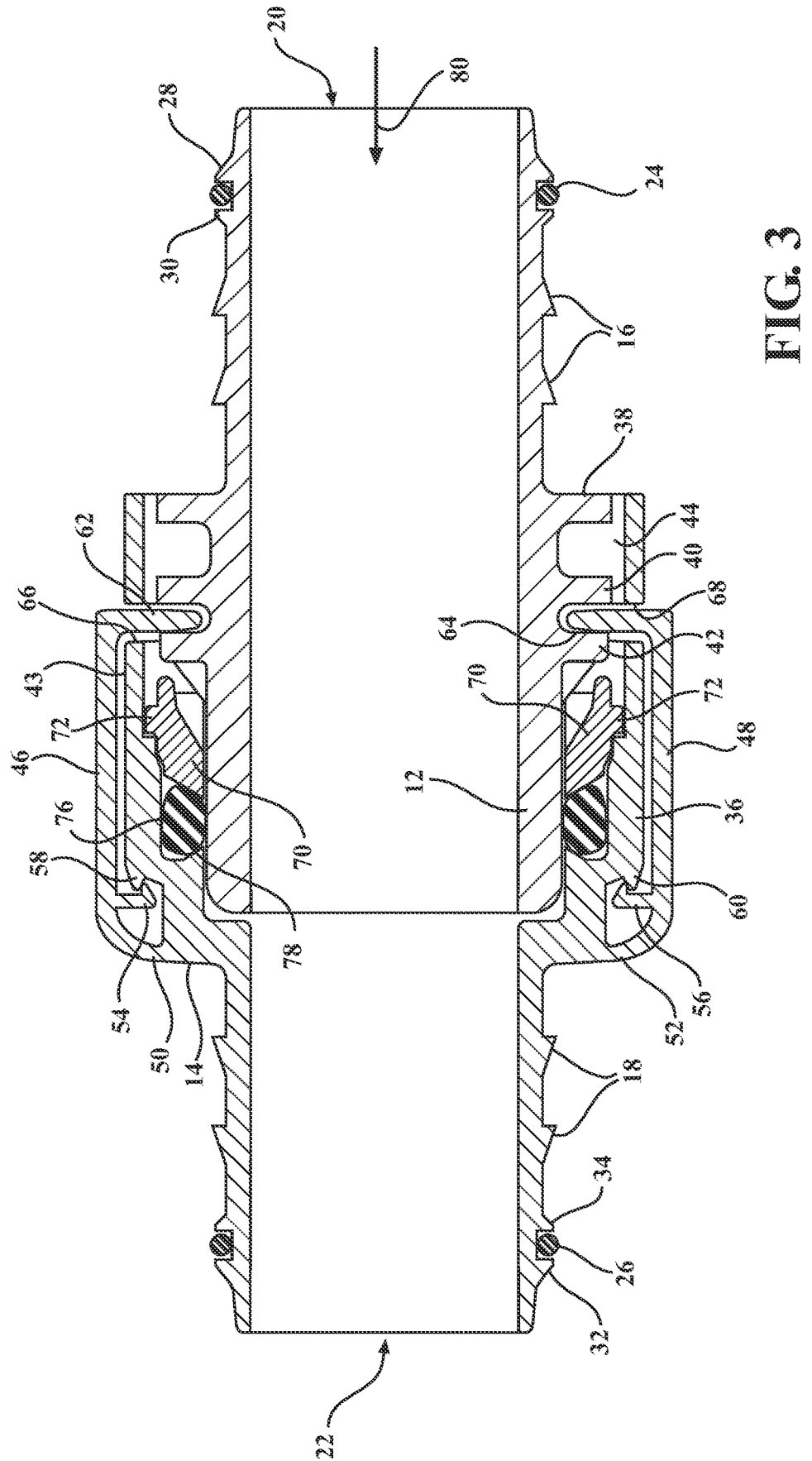
FIG. 3 is a lengthwise cutaway view of FIG. 1 and shows the features of the O-ring and retainer configured at the annular mating interfaces established between the male and female end forms.

The female end form 14 further includes an annular enlarged or barrel portion 36 integrally formed with the extending tubular body exhibiting the gripping locations 18 for receiving an end-most portion of the male end form 12 (see FIG. 3). The male end form 12 exhibits a series of intermediate located annular ledge projections as shown at 38, 40 and 42 in each of the axial cutaway views of FIGS. 3-4. Also depicted is a ramped location 43 (see again FIGS. 3-4) configured upon the exterior of the male end form 12 in proximity to the end-most located exterior ledge 42.

An annular interior of the female end form barrel 36 includes a first inward projection 44 which seats within a valley formed between the ledges 38/40. The female end form barrel 36 further includes a pair of integrally formed latches, see at 46 and 48, which are molded to the female end form (see at locations 50 and 52 in FIG. 4) while the latches are in the open position (at 46' and 48') as shown in FIG. 4.

Figure 2:
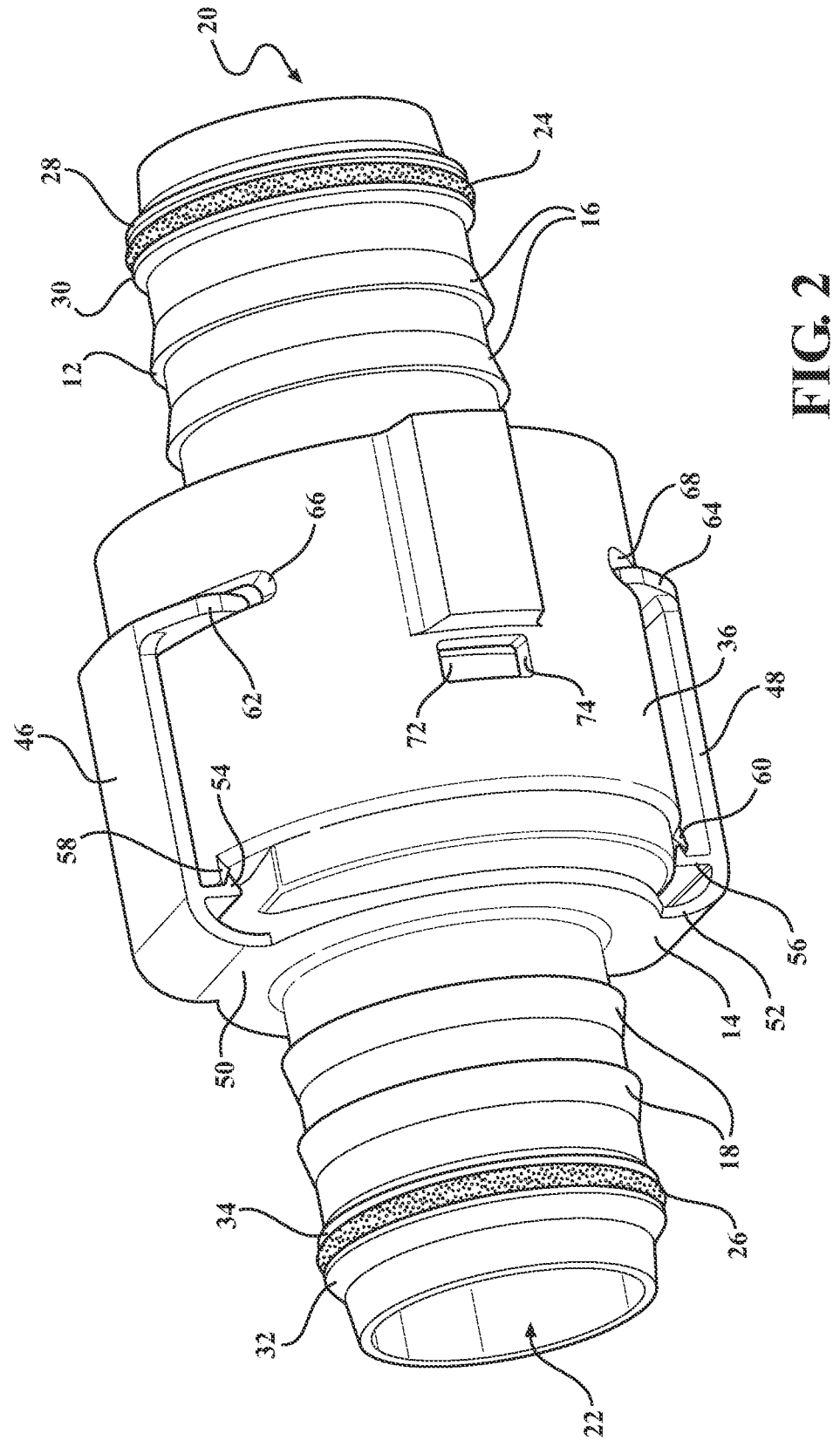
FIG. 2 provides a rotated perspective view of the quick connector assembly of FIG. 1 and better showing the integration of the latch into the female end form in combination with the retainer engagement window.

The latches 46/48 (see as best shown in FIG. 2) each include a thin planar shaped body extending from the integrated ends 50/52 which secure to an end surface of the main barrel 14 during the molding process. The latches each further include a first inside catch portion (see at 54 for latch 46 and further at 56 for latch 48) which are configured to engage opposing overhang locations 58 and 60 of the female barrel 36. The latches 46/48 also include inward angled end portions 62/64 which, upon being inwardly engaged, extend through annular slots 66/68 configured into the female barrel 36 and to seat between the male end form configured ledges 40/42 (see again FIGS. 3-4).

Figure 4:
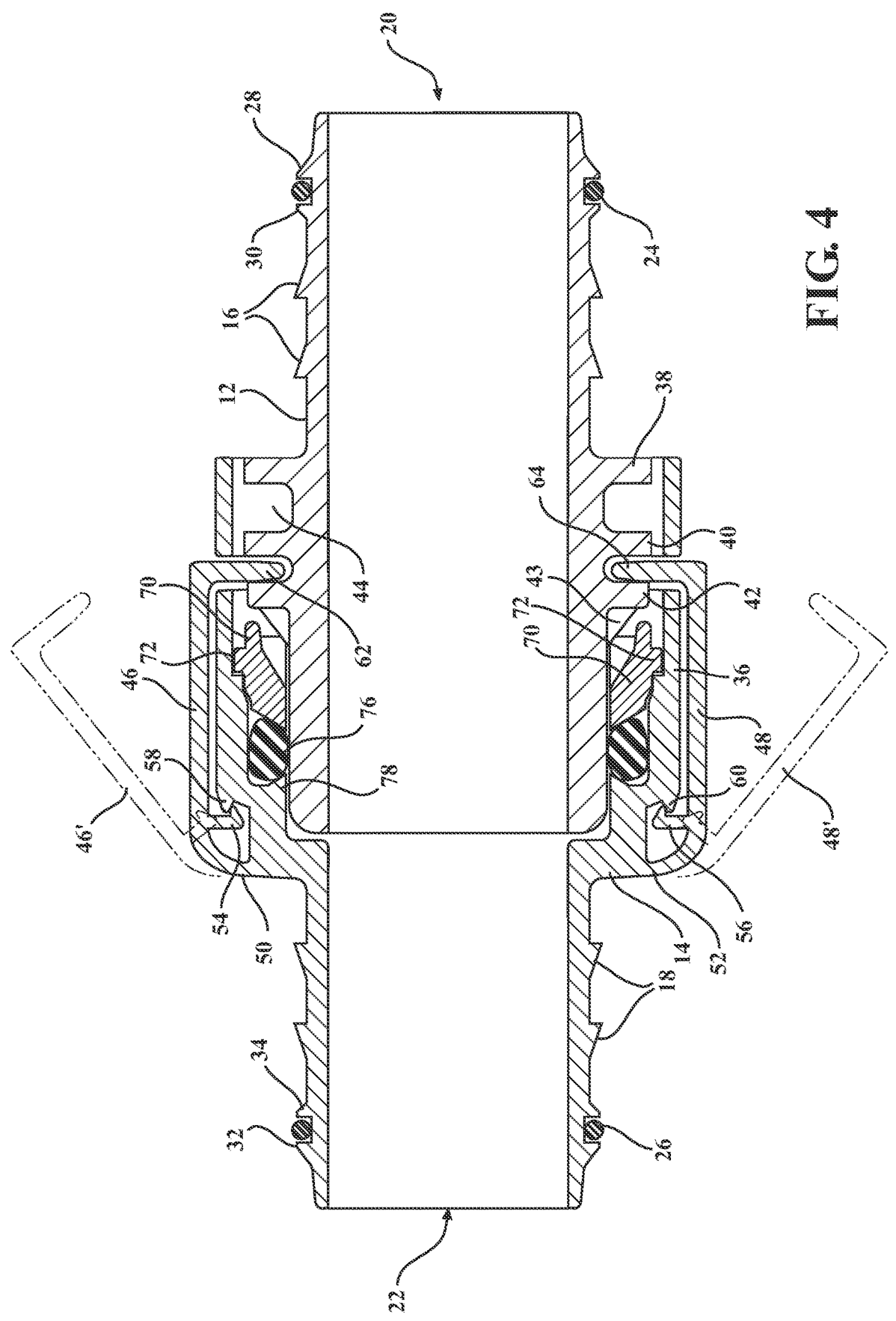
FIG. 4 is a succeeding view to FIG. 3 and depicting the integrated female end form latches which are molded in the open position and inwardly engaged in an assembled position relative to the male end form.

As best shown in FIGS. 3-4, one or more annular or ring shaped retainers 70 are provided in the female barrel interior extending about it's circumference, such as which is constructed of but not limited to a (PA66), polypropylene, or other suitable plastic material, and which can again include any graphene or graphene derivative material). The retainer 70 includes an outer tab portion 72 which are outwardly projected to seat within aligning windows (at 74) configured in the female end form barrel 36. Also shown is a main O-ring 76 (such as again constructed without limitation of an EPDM material having a graphene or graphene derivative additive) is shown in FIGS. 3-4 seating against an inside capture surface 78 of the female end form barrel 36.

In operation, the integrally formed latches are folded into the closed position (see again FIG. 4) prior to assembly. As shown in FIG. 3, the male end form 12 is aligned with the open end of the female end form barrel 36, and is then relatively inserted toward the female interior in an axial direction 80. The angled exterior ramp 43 of the male end form 12 coacts against and outwardly deflects the first inward projection 44 of the female end form 14, along with the end most inward angled end portions 62/64 of the latches 46/48 until the first inward projection 44 seats between male ledges 38/40 and the latch end portions 62/64 seat between the male ledges 40/42 (see again FIGS. 3-4). At this point, the quick connect is fully assembled in a seal-tight and verifiable fashion, with subsequent disassembly by installing a separate (but not required) tool (not shown) with a flattened bit edge engaging an underside of each of the latches, which are then pivoted in an outwardly opened position (again at 46' and 48' in FIG. 4) in order to subsequently retract the male end form 12 and open the fluid quick connection.

Figure 5:
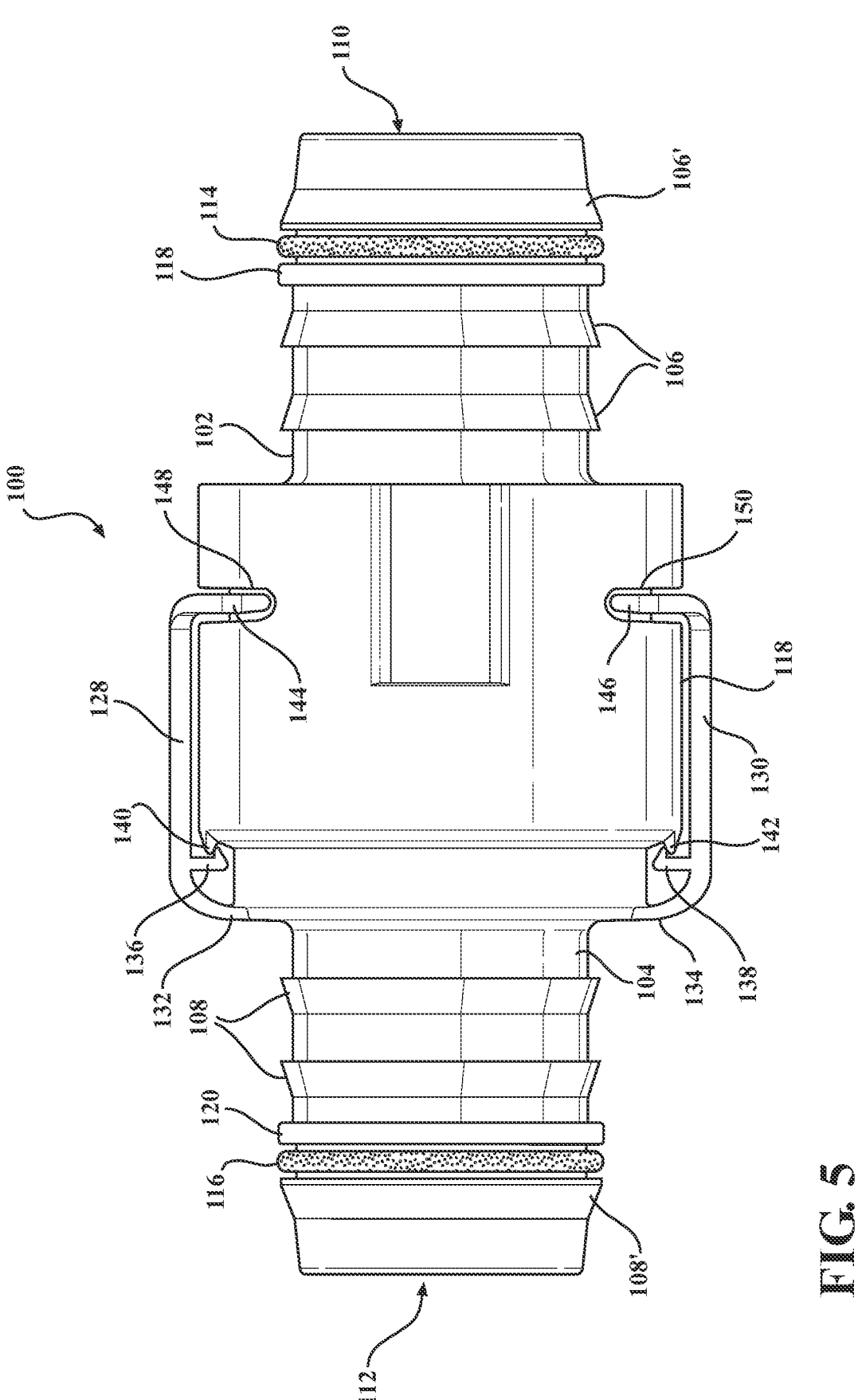
FIG. 5 depicts a plan view illustration of a fluid quick connector assembly according to a second non-limiting embodiment of the present invention and depicting male and female interconnecting end forms in a fully seated and latched position.
Figure 6:
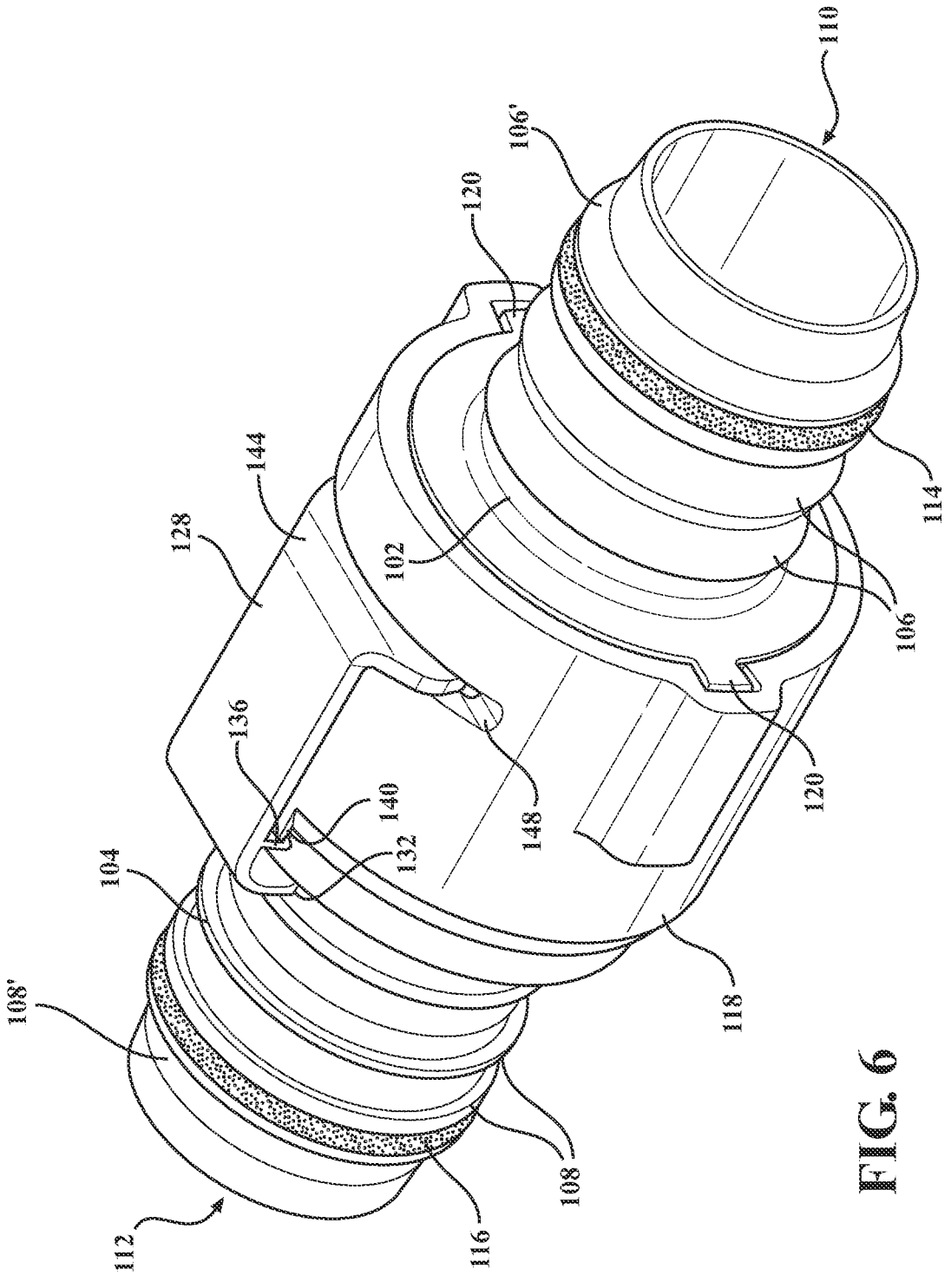
FIG. 6 provides a rotated perspective view of the quick connector assembly of FIG. 5 and better showing the integration of the latch into the female end form.

Referring now to FIG. 5, depicted is a plan view illustration of a fluid quick connector assembly, generally at 100, according to a second non-limiting embodiment of the present invention and depicting male 102 and female 104 interconnecting end forms in a fully seated and latched position. With further reference to the succeeding views, including the lengthwise cutaway depictions of FIGS. 7-8, each of the male end form 102 and interfacing female end form 104 are again constructed of a suitable plastic material not limited to any of a polyamide (PA66) or polypropylene with glass fiber reinforcement, and which further includes a graphene or graphene derivative material for reducing permeation of oxygen and water through the bodies, such as when employed in an EV battery coolant application, and in order to maintain an ideal 50/50 water to glycol ratio for the coolant.

The listing of alternate plastic materials and fillers incorporated into the male and female end forms is open-ended and can include, without limitation, any of polyethylene terephthalate (PET), polyvinyl chloride (PVC), high-density polyethylene (HDPE) and low density polyethylene (LDPE). Filler materials associated with any of the above can include glass fiber, calcium carbonate filler, talc filler, barium sulfate filler and sodium sulfate filler.

Both the male end form 102 and female end form 104 each further include a tubular body shape having a plurality of axially spaced annular and exterior located/reverse angled gripping projections (see at 106 for male end form 102 and further at 108 for female end form 104) for receiving separate fluid lines (not shown) which are dimensioned to be resistively engaged over open ends, at 110 and 112 respectively, of the male and female end forms 102/104.

Each of the male 102 and female end forms 104 further include a gasket ring or seal (see at 114 and 116) which can be constructed without limitation from an EPDM material incorporating a graphene or graphene derivative material. Other possible materials for producing the gasket ring or seal include, without limitation, other types of fluoropolymers and thermoplastics (not limited to a thermoplastic vulcanizate) which can also include the addition of graphene and graphene derivatives. As further shown, the exterior annular profile of each of the male 102 and female 104 end forms further include a circumferential extending and opposing shoulder (see at 118 for male end form 102 and at 120 for female end form 104) which is spaced a distance from selected gripping projections 106' and 108' for capturing and retaining in position the EPDM gasket seals 114/116 during installation of the adjoining sections of tubing (not shown).

The female end form 104 further includes an annular enlarged or barrel portion 118 integrally formed with the extending tubular body exhibiting the gripping locations 108. The male end form 102 exhibits a series of intermediate located annular ledge projections as shown at 120 and 122 in each of the axial cutaway views of FIGS. 7-8. Also depicted is a ramped location 124 (see again FIGS. 7-8) configured upon the exterior of the male end form 12 in proximity to the end-most located annular ledge 122.

An annular interior of the female end form barrel 118 includes a first inward projection 126 which seats within a valley formed between the ledges 120/122. The female end form barrel 118 further includes a pair of integrally formed latches 128 and 130 which are molded to the female end form (see at locations 132 and 134) while the latches are in the open position (at 128' and 130') as shown in FIG. 8.

The latches 128/130 each include a thin planar shaped body extending from the integrated ends 132/134 which secure to an end surface of the main barrel 118 during the molding process. The latches each further include a first inside catch portion (see at 136 for latch 128 and further at 138 for latch 130) which are configured to engage opposing overhang locations 140 and 142 of the female end barrel 118.

Figure 7:
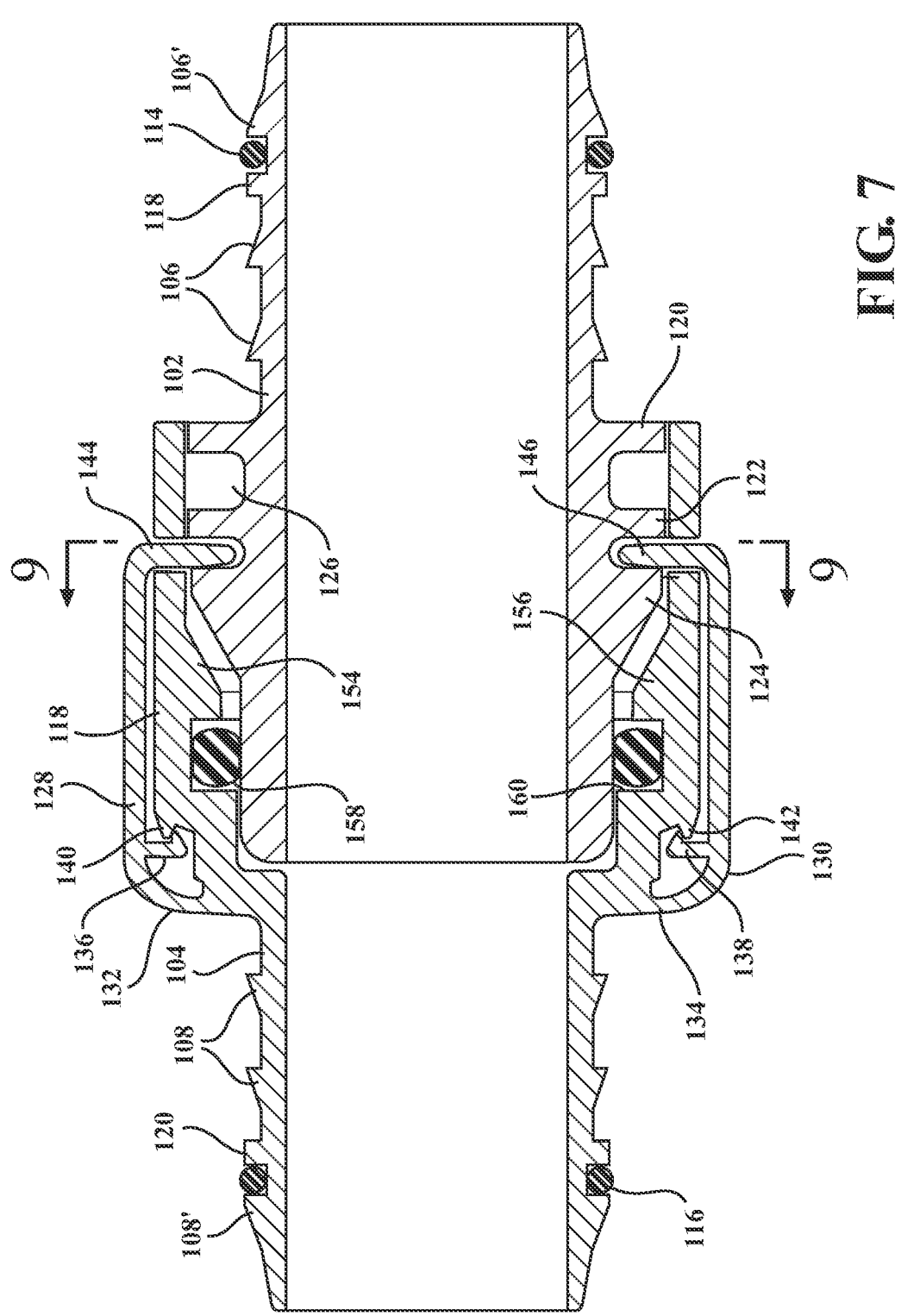
FIG. 7 is a lengthwise cutaway view of FIG. 5 and shows the features of the integrated O-ring retainer configured at the annular mating interfaces established between the male and female end forms.
Figure 8:
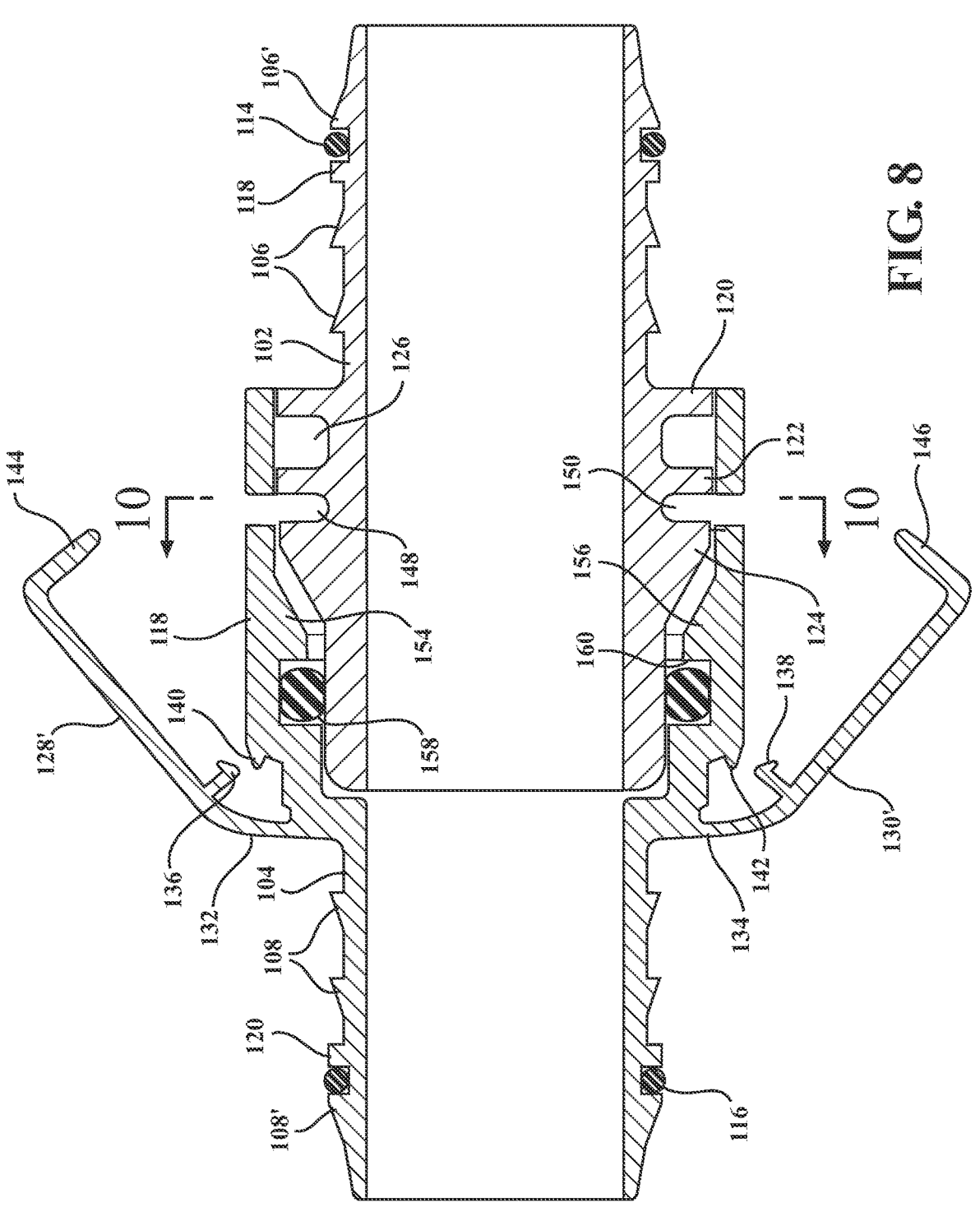
FIG. 8 is a succeeding view to FIG. 7 and depicting the integrated female end form latches which are molded in the open position and inwardly engaged in an assembled position relative to the male end form.
Figure 9:
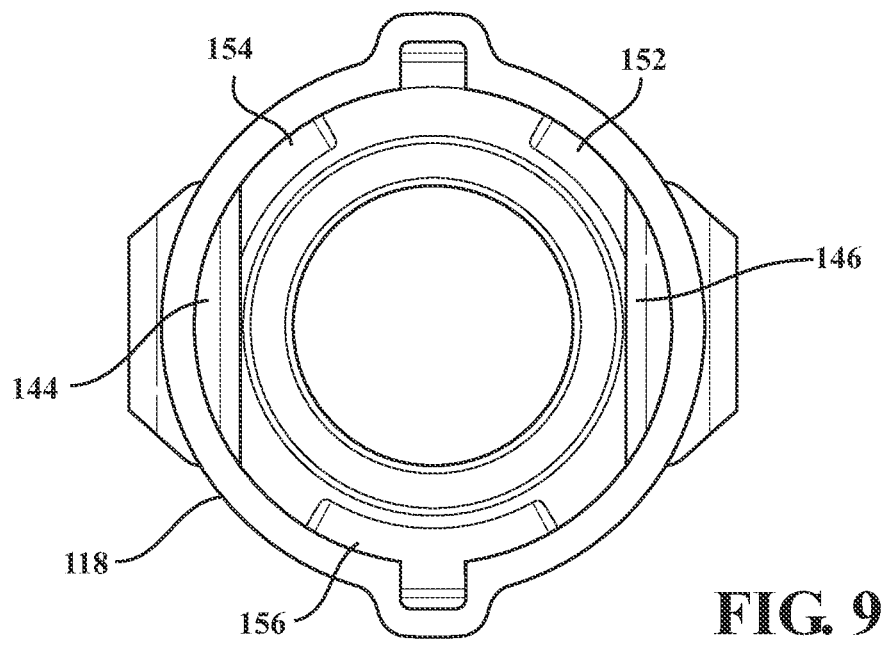
FIG. 9 is a cutaway illustration taken along line 9-9 of FIG. 7 and depicting the female end form with latch in the assembled position, as well as showing the integrated O-ring retainer.
Figure 10:
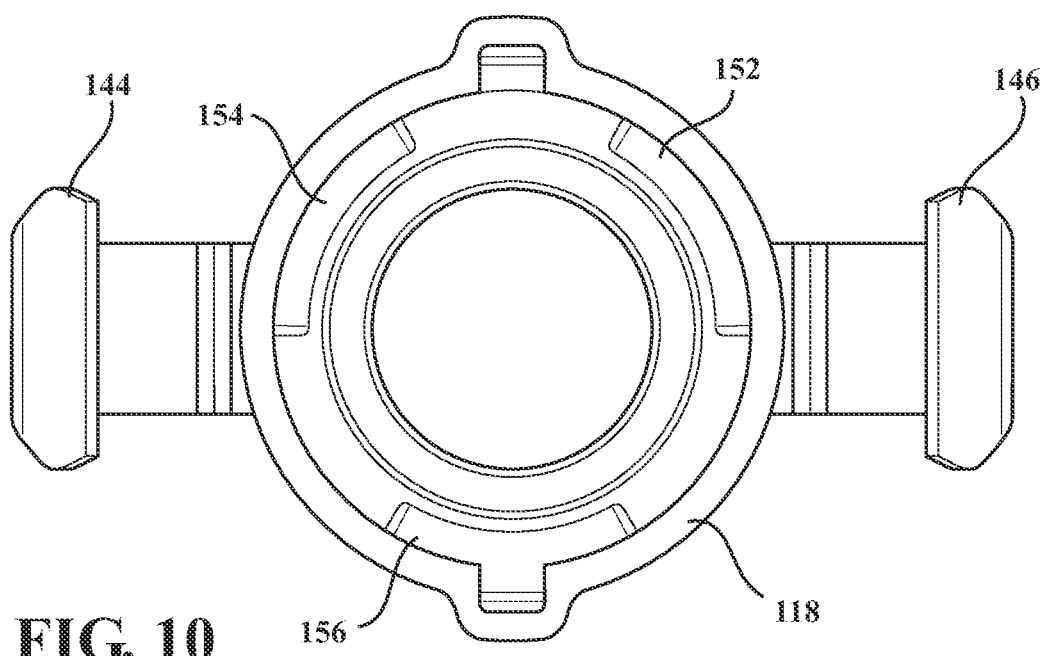
FIG. 10 is a cutaway illustration taken along line 10-10 of FIG. 8 and depicting the female end form with latch in the opened position, and again showing the integrated O-ring retainer.

The latches 128/130 also include inward angled end portions 144/146 which, upon being inwardly engaged, extend through annular slots 148/150 (see as best shown in FIGS. 5 and 8) configured into the female barrel 118 and to seat between the male end form configured ledge 122 and ramped location 124. FIGS. 9 and 10 provide a pair of cutaway illustrations taken respectively along line 9-9 of FIG. 7 (assembled) and line 10-10 of FIG. 8 (open) depicting the female end form with latch, as well as showing the integrated O-ring.

As best shown in FIG. 7 in combination with the cutaway views of FIGS. 9-10, the female end form 104 includes integrated O ring retainer locations 152, 154 and 156 provided in the female barrel interior, such as which are constructed without limitation from a polyamide (PA66), polypropylene, or other suitable plastic material which can again include any graphene or graphene derivative material). The retainer locations, upon engaging the male end form 102 within the female end form 104, generally overlap the ramped location 124 as best shown in FIG. 7. Also shown is a main O-ring 158 (such as again constructed without limitation of an EPDM material having a graphene or graphene derivative additive) and which seats against an inside annular capture pocket 160 of the female end form barrel 118.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A fluid quick connector assembly, comprising:
a male end form and a mating female end form; and
first and second latches integrally formed with said female end form for securing said male end form upon being inserted into said female end form;
said latches each including an inside extending catch portion which engages an overhang location in said female end form; and
said latches further including an inward angled end portion which, upon being inwardly engaged, extend through annular slots in said female end form and seat between annular ledges in said male end form.

2. The quick connector assembly of claim 1, further comprising said male and female end forms having a tubular shape and being constructed of a plastic material including any of a PA66 or polypropylene with glass fiber reinforcement and further including any of a graphene or graphene derivative material.

3. The quick connector assembly of claim 1, further comprising said male and female end forms having a tubular shape and being constructed of a plastic material selected from any of polyethylene terephthalate, polyvinyl chloride, high density polyethylene and low density polyethylene with a filler material, said plastic material including either of a graphene or graphene derivative material.

4. The quick connector assembly of claim 3, said filler material further comprising any of glass fiber, calcium carbonate filler, talc filler, barium sulfate filler and sodium sulfate filler.

5. The quick connector assembly of claim 1, each of said male and female end forms further comprising a tubular body shape having a plurality of axially spaced annular and exterior located gripping projections for receiving separate fluid lines which are dimensioned to be resistively engaged over the open ends respectively, of said male and female end forms.

6. The quick connector assembly of claim 1, said male and female end forms further comprising a gasket seal that can be constructed from an EPDM material incorporating a graphene or graphene derivative material.

7. The quick connector assembly of claim 6, said male and female end forms further comprising an exterior annular profile including pairs of circumferential extending and opposing shoulders for capturing and retaining in position said gasket seal.

8. The quick connector assembly of claim 1, said female end form further comprising an annular enlarged barrel integrally formed with said tubular shape and exhibiting gripping locations.

9. The quick connector assembly of claim 8, further comprising a ramped location upon an exterior of said male end form in proximity to an end-most located of said annular ledges.

10. The quick connector assembly of claim 9, said latches each further comprising a planar-shaped body extending from integrated ends which secure to an end surface of said barrel.

11. The quick connector assembly of claim 8, further comprising a retainer located in said female barrel interior, said retainer being constructed of either of a polyamide (PA66) or polypropylene material, said retainer including any graphene or graphene derivative material.

12. The quick connector assembly of claim 11, said retainer further comprising outer tab portions which are outwardly projected to seat within aligning windows in said female end form barrel.

13. The quick connector assembly of claim 8, further comprising an O-ring retainer integrally formed with an annular interior of said enlarged barrel of said female end form.

14. The quick connector assembly of claim 8, further comprising a main O-ring constructed from an EPDM material having a graphene or graphene derivative additive, seating against an inside capture surface of said female end form barrel.

* * * * *